US009769747B2

(12) United States Patent
Tan et al.

(10) Patent No.: US 9,769,747 B2
(45) Date of Patent: Sep. 19, 2017

(54) ELECTRICITY SAVING METHOD FOR TERMINAL DEVICE, AND TERMINAL DEVICE

(71) Applicant: ZTE CORPORATION, Shenzhen, Guangdong Province (CN)

(72) Inventors: Guanjun Tan, Shenzhen (CN); Jianning Wu, Shenzhen (CN); Anli Zhong, Shenzhen (CN); Zuoyi Zhu, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/392,262

(22) PCT Filed: Sep. 6, 2013

(86) PCT No.: PCT/CN2013/083036
§ 371 (c)(1),
(2) Date: Feb. 1, 2016

(87) PCT Pub. No.: WO2014/205913
PCT Pub. Date: Dec. 31, 2014

(65) Prior Publication Data
US 2016/0150471 A1 May 26, 2016

(30) Foreign Application Priority Data
Jun. 24, 2013 (CN) .......................... 2013 1 0254116

(51) Int. Cl.
H04W 52/02 (2009.01)

(52) U.S. Cl.
CPC ..... H04W 52/0209 (2013.01); H04W 52/029 (2013.01); Y02B 60/50 (2013.01)

(58) Field of Classification Search
CPC ..... H04W 52/0287–52/0293; H04W 52/0267; H04W 52/027; H04W 52/0209; Y02B 60/50
(Continued)

(56) References Cited

U.S. PATENT DOCUMENTS 8,935,607 B2 * 1/2015 Zhu ................... G06F 17/30905
715/234
2003/0226047 A1 * 12/2003 Park ...................... G06F 1/3203
713/300

FOREIGN PATENT DOCUMENTS

CN 101237656 A 8/2008
CN 102857643 A 1/2013
(Continued)

OTHER PUBLICATIONS

International Search and Written Opinion mailed Mar. 27, 2014 in PCT/CN2013/083036.

Primary Examiner — Raymond Dean
(74) Attorney, Agent, or Firm — Plumsea Law Group, LLC

(57) ABSTRACT

Disclosed are a power saving method for a terminal device and the terminal device thereof, wherein the method includes: a terminal device enabling a power saving mode and obtaining an adjusted central processing unit (CPU) clock speed set by a user and an adjusted screen resolution set by the user; if the terminal device obtains the adjusted CPU clock speed set by the user, the terminal device adjusting the CPU to operate according to the adjusted CPU clock speed set by the user; if the terminal device obtains the adjusted screen resolution set by the user, the terminal device adjusting a screen display according to the adjusted screen resolution set by the user. The embodiment of the present document saves the power consumption of a terminal device by downsizing the screen display and/or reducing (Continued)

the CPU clock speed, thereby effectively reducing power consumption of the terminal device.

8 Claims, 2 Drawing Sheets

(58) Field of Classification Search
USPC .......................................................... 455/574
See application file for complete search history.

(56) References Cited

FOREIGN PATENT DOCUMENTS

| CN | 103135742 A | 6/2013 |
|---|---|---|
| WO | 2005033919 A2 | 4/2005 |
| WO | 2014205913 A1 | 12/2014 |

\* cited by examiner

ELECTRICITY SAVING METHOD FOR TERMINAL DEVICE, AND TERMINAL DEVICE

CROSS-REFERENCE TO RELATED APPLICATION(S)

This application is the U.S. National Phase application of PCT application number PCT/CN2013/083036 having a PCT filing date of Sep. 6, 2013, which claims priority of Chinese patent application 201310254116.3 filed on Jun. 24, 2013, the disclosures of which are hereby incorporated by reference.

TECHNICAL FIELD

The present document relates to the field of mobile terminal device technologies, and more particularly, to a power saving method for a terminal device and the terminal device thereof.

BACKGROUND OF RELATED ART

Nowadays, the hardware computing power of the mobile intelligent terminal is very powerful, besides basic mobile communications services such as calls, text messages, it also has many other features. Its computing capacity and processing speed are in no way inferior to PCs or laptop computers, and the size of the LCD screen also tends to be larger and larger, allowing users to get a better experience. High-clock speed, multi-core CPU (central processing unit) and a variety of hardware accelerators are increasingly used in a variety of mobile intelligent terminals.

According to the statistics, the CPU and large LCD are the main power consuming objects in the mobile intelligent terminal. Although the capacity of rechargeable batteries in the mobile intelligent terminal is increasing, it is impossible to achieve unlimited capacity based on the considerations of the current technological level and the economic costs as well as the terminal volume. Due to the significantly shortened life cycle of a single charge of the mobile intelligent terminal, a number of users using mobile intelligent terminals will be equipped with multiple batteries or carry portable charging devices. The use of these auxiliary devices, for the users, needs to carry additional accessories, which is inconvenient for use.

In view of the mass market applications of the large-screen mobile intelligent terminal, the battery life of the terminal will be more and more criticized by users, and extending the battery life under the conditions of existing hardware and software is very urgent, therefore, designing an appropriate power saving method on the basis of the current hardware and software is very important.

SUMMARY

To solve the technical problem, the present document is to provide a power saving method for a terminal device and the terminal device thereof, to save power consumption of the terminal device and extend the standby time of the terminal device.

To solve the abovementioned technical problem, the present document provides a power saving method for a terminal device, wherein the method comprises:

a terminal device enabling a power saving mode, obtaining an adjusted central processing unit (CPU) clock speed set by a user and/or an adjusted screen resolution set by the user;

the terminal device adjusting the CPU to operate according to the adjusted CPU clock speed set by the user if obtaining the adjusted CPU clock speed set by the user; adjusting a screen display according to the adjusted screen resolution set by the user if obtaining the adjusted screen resolution set by the user.

Preferably, the method further comprises:

the terminal device further judging whether the adjusted CPU clock speed set by the user is available if obtaining the adjusted CPU clock speed set by the user, wherein said judging comprises: the terminal judging whether the adjusted CPU clock speed set by the user exceeds a factory setting of the CPU clock speed, if not exceeding, then judging whether the adjusted CPU clock speed set by the user is lower than a clock speed of minimum processing capability supporting voice and short messaging service operations, if not lower, then judging that the adjusted CPU clock speed set by the user is available.

Preferably, the method further comprises:

the terminal device further adjusting whether the judged screen resolution set by the user is available if obtaining the adjusted screen resolution set by the user, wherein said judging comprises: the terminal device judging whether the adjusted screen resolution set by the user exceeds an original screen resolution, if not exceeding, judging whether the adjusted screen resolution set by the user is lower than a minimum resolution for normal viewing, if not lower, then judging that the adjusted screen resolution set by the user is available.

Preferably, the judgment further comprises:

after the terminal device judges that the adjusted CPU clock speed set by the user is not lower than the clock speed of the minimum processing capability supporting voice and short messaging service operations, further judging whether an adjustment amplitude is an integer multiple of 10 Mbps, and if yes, then judging that the adjusted CPU clock speed set by the user is available.

Preferably, the method further comprises:

before the terminal device obtains the adjusted CPU clock speed set by the user and/or the adjusted screen resolution set by the user, the terminal device correspondingly obtaining and saving a current CPU clock speed and/or screen resolution;

when the terminal device needs to exit from the power saving mode, if the CPU has been adjusted to operate according to the adjusted CPU clock speed set by the user, then restoring to the saved CPU clock speed; if the screen display has been adjusted according to the adjusted screen resolution set by the user, then restoring to the saved screen resolution.

A terminal device, comprises: a user interaction module and a task control module, and further comprising a central processing unit (CPU) clock speed adjustment module and/or a screen adjustment module, wherein:

the task control module is configured to: enable a power saving mode, and if receiving an adjusted CPU clock speed set by a user and sent by the user interaction module, send the received CPU clock to the CPU clock speed adjustment module, if receiving an adjusted screen resolution set by the user, send the received screen resolution to the screen adjustment module;

the user interaction module is configured to: after the task control module enables the power saving mode, obtain the adjusted CPU clock speed set by the user and/or the adjusted screen resolution set by the user, and send the adjusted CPU clock speed set by the user and/or the adjusted screen resolution set by the user to the task control module;

the CPU clock speed adjustment module is configured to adjust the CPU to operate according to the adjusted CPU clock speed set by the user;

the screen adjustment module is configured to: adjust a screen display according to the adjusted screen resolution set by the user.

Preferably, the task control module is further configured to: if receiving the adjusted CPU clock speed set by the user, judge whether the adjusted CPU clock speed set by the user is available, wherein said judging comprises: judging whether the adjusted CPU clock speed set by the user exceeds a factory setting of the CPU clock speed, if not exceeding, judging whether the adjusted CPU clock speed set by the user is lower than a clock speed of minimum processing capability supporting voice and SMS service operations, if not lower, judge that the adjusted clock speed set by the user is available.

Preferably, the task control module is further configured to: if receiving the adjusted screen resolution set by the user, judge whether the adjusted screen resolution set by the user is available, wherein said judging comprises: judging whether the adjusted screen resolution set by the user exceeds an original screen resolution, if not exceeding, then judging whether the adjusted screen resolution set by the user is lower than a minimum resolution for normal viewing, and if not lower, then judging that the adjusted screen resolution set by the user is available.

Preferably, the task control module is further configured to: after judging that the adjusted CPU clock speed set by the user is not lower than the clock speed of the minimum processing capability supporting voice and short messaging service operations, further judge whether an adjustment amplitude is an integer multiple of 10 Mbps, and if yes, judge that the adjusted CPU clock speed set by the user is available.

Preferably, the terminal device further comprises a system interaction module, wherein:

the system interaction module is configured to: before the user interaction module obtains the adjusted CPU clock speed set by the user and/or the adjusted screen resolution set by the user, correspondingly obtain a current CPU clock speed and/or screen resolution, and send the current CPU clock speed and/or screen resolution to the task control module to save;

the task control module is further configured to: when needing to exit from the power saving mode, if the CPU has been adjusted to operate according to the adjusted CPU clock speed set by the user, send the saved CPU clock speed to the CPU clock speed adjustment module; if the screen display has been adjusted according to the adjusted screen resolution set by the user, send the saved screen resolution to the screen adjustment module;

the CPU clock speed adjustment module is further configured to: restore the CPU to the CPU clock speed sent by the task control module;

the screen adjustment module is further configured to: restore the screen to the screen resolution sent by the task control module.

In summary, the embodiment of the present document saves power consumption of a terminal device by reducing the screen display and/or reducing the CPU clock speed, whish has the following beneficial effects:

(1) the applicability is strong: it proposes a solution for the problem that the battery life of the current large-screen mobile intelligent terminal is short;

(2) the effect is significant: it effectively reduces the power consumption of the terminal, and the power saving efficiency is above 30%;

(3) the compatibility is good: it can simultaneously be used with other existing power saving methods, so that the effect is more obvious;

(4) the operation is easy, the power saving task in the present document can work as a process of the terminal operating system, the user can enable and disable a power saving task at any time without affecting the normal operation of the terminal operating system.

PREFERRED EMBODIMENTS OF THE INVENTION

Hereinafter in conjunction with the accompanying drawings, the embodiments of the present application will be described in detail. It should be noted that in the case of no conflict, embodiments and features in the embodiments of the present application may be combined randomly with each other.

Figure 1:
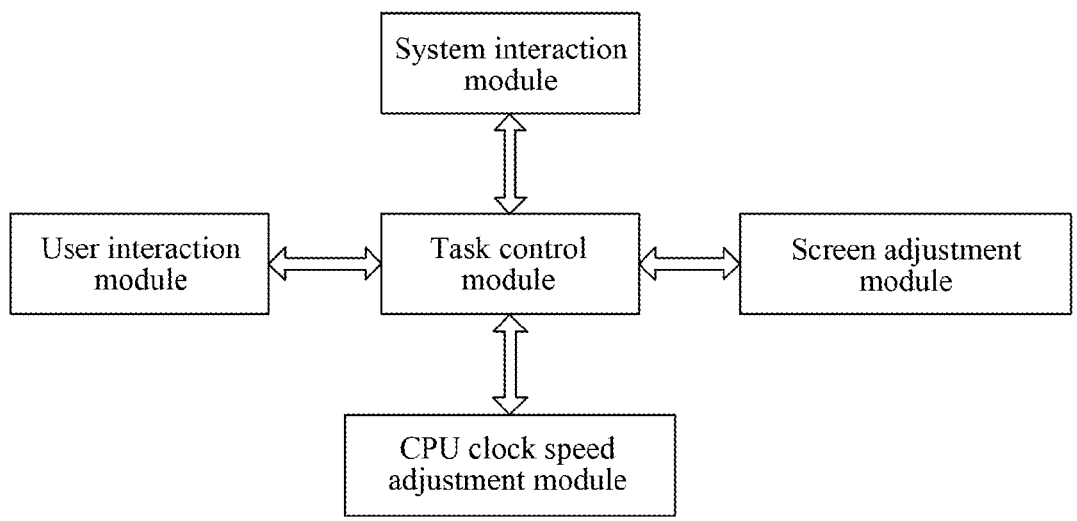
FIG. 1 is a block diagram of the composition of a terminal device in accordance with an embodiment of the present document.

As shown in FIG. 1, the terminal device of the present embodiment comprises a user interaction module and a task control module, and further comprises a CPU clock speed adjustment module and/or a screen adjustment module, and it may further comprise a system interaction module. The system interaction module, the user interaction module, the CPU clock speed adjustment module and the screen adjustment module are respectively connected with the task control module.

The user interaction module provides an interface to interact with the user; obtains setting parameters input by the user; outputs the operating state of a power saving task; after the task control module enables the power saving mode, obtains the adjusted CPU clock speed set by the user and/or the adjusted screen resolution set by the user, and sends to the task control module.

The task control module controls the terminal device to enter into or exit from the power saving mode; if receiving an adjusted CPU clock speed set by the user and sent by the user interaction module, then sends it to the CPU clock speed adjustment module, if receiving the adjusted screen resolution set by the user, then sends it to the screen adjustment module;

It judges whether the screen adjustment parameter and the CPU clock speed adjustment parameter set by the user are available; if receiving the adjusted CPU clock speed set by the user, judges whether the adjusted CPU clock speed set by the user is available, said judging comprises: judging whether the adjusted CPU clock speed set by the user exceeds the factory setting of the CPU clock speed, if not exceeding, judging whether it is lower than the clock speed of the minimum processing capability supporting the voice and short messaging service operations, if not lower, then judging that adjusted CPU clock speed set by the user is available; or judging whether the adjustment amplitude is an integer multiple of 10 Mbps after judging that the adjusted CPU clock speed set by the user is not lower than the clock speed of the minimum processing capability supporting the voice and short messaging service operations, and if yes, judging that the adjusted CPU clock speed set by the user is available;

if receiving the adjusted screen resolution set by the user, judges whether the adjusted screen resolution set by the user is available, and said judging comprises: judging whether the adjusted screen resolution set by the user exceeds the original screen resolution, if not exceeding, judging whether it is lower than the minimum resolution of normal viewing, if not lower, judging that the adjusted screen resolution set by the user is available.

The CPU frequency adjustment module executes a CPU clock speed adjustment according to the adjusted CPU clock speed set by the user and sent by the task control module and feeds back a result.

The screen adjustment module executes a screen adjustment according to the adjusted screen resolution set by the user and sent by the task control module and feeds back a result.

The system interaction module is responsible for obtaining parameters such as the CPU clock speed and the screen resolution of the terminal device; is responsible for interacting with the terminal operating system; before the user interaction module obtains the adjusted CPU clock speed set by the user and/or the adjusted screen resolution set by the user, correspondingly obtaining the current CPU clock speed and/or screen resolution, and sending to the task control module to save.

The task control module is further used to, when it needs to exit from the power saving mode, if the CPU has been adjusted to operate in accordance with the adjusted CPU clock speed set by the user, send the saved CPU clock speed to the CPU clock speed adjustment module; if the screen display has been adjusted according to the adjusted screen resolution set by the user, send the saved screen resolution to the screen adjustment module.

The CPU clock speed adjustment module is further used to restore the CPU to the CPU clock speed sent by the task control module.

The screen adjustment module is further used to restore the screen to the screen resolution sent by the task control module.

The process of the terminal device entering into the power saving mode from the normal mode comprises:

the task control module monitoring whether the user sets to enter into the power saving mode; if it detects that the user sets to enter into the power saving mode or the condition for entering into the power saving mode is met, the task control module enabling the power saving task, and the terminal device entering into the power saving mode for running.

The condition for entering into the power saving mode detected by the task control module may be that the battery charge is lower than a predetermined value, and the like.

The process of the terminal device entering into the normal mode from the power saving mode comprises:

the task control module monitoring whether the user sets to enter into the normal mode; if it detects that the user sets to restore to the normal mode or the condition for restoring to the normal mode is met, the task control module first restores to the original CPU frequency and screen resolution of the terminal device, the task control module disables the power saving task, and the terminal device restores to the normal mode for running.

Figure 2:
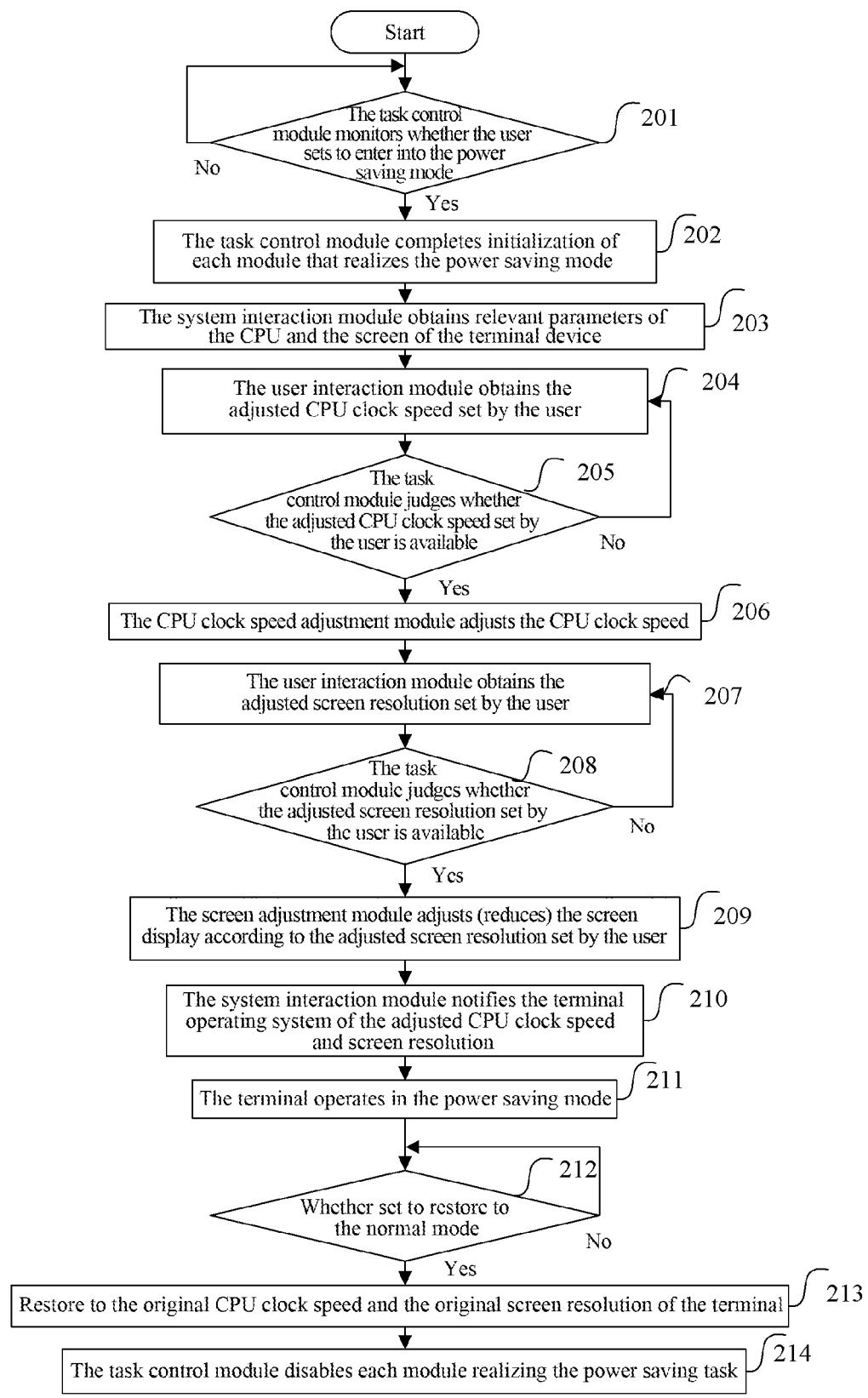
FIG. 2 is a flow chart of a power saving method for a terminal device in accordance with an embodiment of the present document.

The power saving method for terminal device in accordance with the present embodiment, as shown in FIG. 2, comprises:

in step 201, the task control module monitors whether the user sets to enter into the power saving mode; if the user sets to enter into the power saving mode, enables the power saving mode, and it proceeds to step 202; otherwise continues to monitor, and it proceeds to step 201;

in step 202, the task control module completes initialization of each module that realizes the power saving mode;

in step 203, the system interaction module obtains relevant parameters such as the current CPU clock speed and screen resolution of the terminal device, and sends them to the task control module to save;

in step 204, the user interaction module prompts the user to set the adjusted CPU frequency, and displays the current CPU clock speed sent by the task control module and obtained by the system interaction module to the user for reference, and obtains the adjusted CPU clock speed set by the user;

in step 205, the task control module judges whether the adjusted CPU clock speed set by the user is available, and if yes, it proceeds to 206, otherwise, it proceeds to step 204;

specific judgment conditions are: a) not exceeding the factory setting of the CPU clock speed of the terminal; b) not lower than the processing operation capability of 100 Mbps supporting the minimum operations of the voice call and short messaging services; c) the adjustment amplitude is an integer multiple of 10 Mbps.

In step 206, the CPU clock speed adjustment module adjusts the CPU to operate according to the adjusted CPU clock speed set by the user;

in step 207, the user interaction module prompts the user to set the adjusted screen resolution, displays the screen resolution obtained by the system interaction module to the user for reference, and obtains the adjusted screen resolution set by the user;

in step 208, the task control module judges whether the adjusted screen resolution input by the user is available, and if yes, it proceeds to step 209; otherwise, it proceeds to step 207;

specific judgment conditions are: a) not exceeding the original resolution screen; b) not lower than the minimum resolution for normal viewing 200*300.

In step 209, the screen adjustment module adjusts (reduces) the screen display according to the adjusted screen resolution set by the user, and does not display the rest or displays the rest as black that is close to the screen color;

in step 210, the system interaction module notifies the terminal operating system module of the adjusted CPU clock speed and screen resolution;

in step 211, the terminal is in the power saving mode;

in step 212, the task control module monitors whether the user sets to restore to the normal mode, if the user sets to restore to the normal mode, it proceeds to step 213; otherwise continues to monitor, and it proceeds to step 212;

in step 213, the CPU clock speed adjustment module restores to the original CPU clock speed of the terminal device, and the screen adjustment module restores to the original screen resolution;

in step 214, the task control module disables each module realizing the power saving task, and the process ends.

In the above, after the terminal device enables the power saving mode, the terminal device respectively adjusts the CPU clock speed and the screen resolution according to the user settings, in different application modes, it may also adjust the CPU clock speed only, or adjust the screen resolution only.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present application is not limited to any specific form of hardware and software combinations.

The above description is only preferred embodiments of the present application and is not used to limit the present application, for a person skilled in the art, the present application may have a variety of modifications and changes. Any changes, equivalent replacements and improvements made within the spirit and principle of the present application should be included within the protection scope of the present application.

INDUSTRIAL APPLICABILITY

The embodiment of the present document saves power consumption of a terminal device by reducing the screen display and/or reducing the CPU clock speed, which has the following beneficial effects:

(1) the applicability is strong: it proposes a solution for the problem that the battery life of the current large-screen mobile intelligent terminal is short;

(2) the effect is significant: it effectively reduces the power consumption of the terminal, and the power saving efficiency is above 30%;

(3) the compatibility is good: it can simultaneously be used with other existing power saving methods, so that the effect is more obvious;

(4) the operation is easy, the power saving task in the present document can work as a process of the terminal operating system, the user can enable and disable a power saving task at any time without affecting the normal operation of the terminal operating system.

What is claimed is:

1. A power saving method for a terminal device, comprising:
the terminal device enabling a power saving mode, obtaining an adjusted central processing unit (CPU) clock speed set by a user and/or an adjusted screen resolution set by the user;
the terminal device adjusting the CPU to operate according to the adjusted CPU clock speed set by the user if obtaining the adjusted CPU clock speed set by the user; and adjusting a screen display according to the adjusted screen resolution set by the user if obtaining the adjusted screen resolution set by the user; and
the terminal device further judging whether the adjusted CPU clock speed set by the user is available if obtaining the adjusted CPU clock speed set by the user, wherein said judging comprises: the terminal judging whether the adjusted CPU clock speed set by the user exceeds a factory setting of the CPU clock speed, if not exceeding, then judging whether the adjusted CPU clock speed set by the user is lower than a clock speed of minimum processing capability supporting voice and short messaging service operations, if not lower, then judging that the adjusted CPU clock speed set by the user is available.

2. The method of claim 1, further comprising:
the terminal device further adjusting whether the judged screen resolution set by the user is available if obtaining the adjusted screen resolution set by the user, wherein said judging comprises: the terminal device judging whether the adjusted screen resolution set by the user exceeds an original screen resolution, if not exceeding, then judging whether the adjusted screen resolution set by the user is lower than a minimum resolution for normal viewing, if not lower, then judging that the adjusted screen resolution set by the user is available.

3. The method of claim 1, wherein, the judgment further comprises:
after the terminal device judges that the adjusted CPU clock speed set by the user is not lower than the clock speed of the minimum processing capability supporting voice and short messaging service operations, further judging whether an adjustment amplitude is an integer multiple of 10 Mbps, and if yes, then judging that the adjusted CPU clock speed set by the user is available.

4. The method of claim 1, further comprising:
before the terminal device obtains the adjusted CPU clock speed set by the user and/or the adjusted screen resolution set by the user, the terminal device correspondingly obtaining and saving a current CPU clock speed and/or screen resolution;
when the terminal device needs to exit from the power saving mode, if the CPU has been adjusted to operate according to the adjusted CPU clock speed set by the user, then restoring to the saved CPU clock speed; if the screen display has been adjusted according to the adjusted screen resolution set by the user, then restoring to the saved screen resolution.

5. A terminal device, comprising hardware performing instructions stored in a non-transitory computer readable medium to execute the following steps:
the terminal device enabling a power saving mode, obtaining an adjusted central processing unit (CPU) clock speed set by a user and/or an adjusted screen resolution set by the user;
the terminal device adjusting the CPU to operate according to the adjusted CPU clock speed set by the user if obtaining the adjusted CPU clock speed set by the user; and adjusting a screen display according to the adjusted screen resolution set by the user if obtaining the adjusted screen resolution set by the user; and
the terminal device judging whether the adjusted CPU clock speed set by the user is available if obtaining the adjusted CPU clock speed set by the user, wherein said judging comprises:
the terminal judging whether the adjusted CPU clock speed set by the user exceeds a factory setting of the CPU clock speed; and
if the adjusted CPU clock speed does not exceed the factory setting, judging whether the adjusted CPU clock speed set by the user is lower than a clock speed of minimum processing capability supporting voice and short messaging service operations; and
if the adjusted CPU clock speed is not lower than the clock speed of minimum processing capability supporting voice and short messaging service operations, judging that the adjusted CPU clock speed set by the user is available.

6. The terminal device of claim 5, wherein the hardware further performing instructions stored in a non-transitory computer readable medium to execute the following steps:

if receiving the adjusted screen resolution set by the user, judging whether the adjusted screen resolution set by the user is available, wherein said judging comprises:
  judging whether the adjusted screen resolution set by the user exceeds an original screen resolution, and
  if the adjusted screen resolution does not exceed the original screen resolution, then judging whether the adjusted screen resolution set by the user is lower than a minimum resolution for normal viewing, and
  if the adjusted screen resolution is not lower than the minimum resolution for normal viewing, then judging that the adjusted screen resolution set by the user is available.

7. The terminal device of claim 5, the hardware further performing instructions stored in a non-transitory computer readable medium to execute the following steps:
  after judging that the adjusted CPU clock speed set by the user is not lower than the clock speed of the minimum processing capability supporting voice and short messaging service operations, further judging whether an adjustment amplitude is an integer multiple of 10 Mbps, and if yes, judge that the adjusted CPU clock speed set by the user is available.

8. The terminal device of claim 5, the hardware further performing instructions stored in a non-transitory computer readable medium to execute the following steps:
  before the terminal device obtains the adjusted CPU clock speed set by the user and/or the adjusted screen resolution set by the user, the terminal device correspondingly obtaining and saving a current CPU clock speed and/or screen resolution; and
  when the terminal device needs to exit from the power saving mode, if the CPU has been adjusted to operate according to the adjusted CPU clock speed set by the user, then restoring to the saved CPU clock speed; and if the screen display has been adjusted according to the adjusted screen resolution set by the user, then restoring to the saved screen resolution.

\* \* \* \* \*